(12) United States Patent
Baxter, Jr. et al.

(10) Patent No.: US 6,951,522 B2
(45) Date of Patent: Oct. 4, 2005

(54) ACTIVE DIFFERENTIAL ASSEMBLY

(75) Inventors: Ralph W. Baxter, Jr., Fort Wayne, IN (US); Randy L. Sommer, Monroeville, IN (US); William G. Hunt, Roanoke, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/348,755

(22) Filed: Jan. 23, 2003

(65) Prior Publication Data

US 2004/0147356 A1 Jul. 29, 2004

(51) Int. Cl.[7] .......................... F16H 37/08; F16H 48/06
(52) U.S. Cl. ...................................... 475/205; 475/225
(58) Field of Search ............................. 475/204–5, 225, 475/246, 317; 180/371–2

(56) References Cited

U.S. PATENT DOCUMENTS

| | | | |
|---|---|---|---|
| RE15,711 E | | 10/1923 | Baker |
| 1,585,141 A | | 5/1926 | Foote |
| 1,660,113 A | | 2/1928 | Bjur |
| 2,314,664 A | | 3/1943 | Shenstone |
| 2,386,917 A | * | 10/1945 | Thornton ..................... 74/391 |
| 3,029,662 A | | 4/1962 | Hause |
| 3,044,320 A | * | 7/1962 | Oudry ......................... 475/28 |
| 3,184,985 A | * | 5/1965 | Dreitzler ...................... 74/377 |
| 3,424,031 A | | 1/1969 | Stockton |
| 3,439,559 A | * | 4/1969 | Duernay et al. .............. 475/28 |
| 3,690,426 A | | 9/1972 | Weisgerber |
| 4,327,603 A | * | 5/1982 | Zaunberger et al. .......... 475/22 |
| 4,392,394 A | | 7/1983 | Hofbauer et al. |
| 4,424,874 A | * | 1/1984 | Koike et al. ................ 180/370 |
| 5,176,589 A | | 1/1993 | Borgudd |
| 5,370,588 A | * | 12/1994 | Sawase et al. ................ 475/84 |
| 5,397,282 A | | 3/1995 | Weidman |
| 5,728,022 A | | 3/1998 | Schultz |
| 5,904,634 A | | 5/1999 | Teraoka |
| 5,910,064 A | | 6/1999 | Kuroki |
| 6,334,832 B1 | | 1/2002 | Heravi et al. |

* cited by examiner

Primary Examiner—Roger Pang
(74) Attorney, Agent, or Firm—Berenato, White & Stavish

(57) ABSTRACT

An active differential assembly provides speed control of an associated output shaft. A differential case is rotatably mounted within a housing to drive a pair of output shafts extending from the differential case in opposite directions for distributing driving force from the engine to wheels. A pair of planetary gear sets are one each disposed about a corresponding output shaft and includes a planetary ring gear, a sun gear fixed to the output shaft, and a planetary carrier rotatably supporting a plurality of planet gears operatively coupling the planetary ring gear with the sun gear. A brake mechanism is disposed between the planetary ring gear and the housing for selectively braking the planetary ring gear to thereby cause an associated increase in speed of the axle shaft.

9 Claims, 5 Drawing Sheets

ACTIVE DIFFERENTIAL ASSEMBLY

BACKGROUND OF THE INVENTION

1. Field of the Invention

The present invention is directed to a differential axle assembly and more particularly to such an assembly having a mechanism to selectively increase or decrease the speed of an output axle shaft using a planetary gear set.

2. Description of the Related Art

In a rear differential apparatus of a rear wheel drive or four wheel drive vehicle in accordance with the above related art, a driving force from an engine is input to a ring gear fixed to a differential case via a drive pinion. Right and left side gears of a bevel gear differential mechanism are respectively connected to right and left output shafts, an input gear of a control mechanism is connected to the differential case and the input gear is meshed with a first pinion gear. The first pinion gear is integrally formed with adjacent second and third pinion gears, which are respectively meshed with a first and second sun gears. The first sun gear at a speed increasing end and the second sun gear at a speed reducing end are respectively input to torque capacity variable couplings and are transmitted to a right output shaft via the respective couplings integrally formed. Friction torque due to an operation of the coupling is reversely transmitted to the differential case through the first sun gear, the second pinion gear, the first pinion gear and the input gear, or via the second sun gear, the third pinion gear, the first pinion gear and the input gear. Thus the distribution of the driving force between the right and left output shafts is controlled by the fact that any one of the increased or reduced couplings becomes in a driving force transmitting state.

In a front differential apparatus of a front wheel drive or four wheel drive vehicle for controlling a distribution of a driving force between right and left output shafts, a similar arrangement is provides as described above. In the front differential apparatus, a driving force from an engine is input to a ring gear of a planetary gear front differential apparatus of a double pinion meshed with an input gear. Then the driving force is output to a right output shaft via two rows of pinion gears meshed with a second gear fixed to a left output shaft, a first sun gear and a pinion carrier.

The second sun gear and a ring gear of a planetary gear mechanism of a double pinion disposed leftward are fixed to the left output shaft connected to a sun gear of a differential mechanism. A speed reducing clutch for directly reducing a rotational speed of a carrier member is disposed in the carrier member supporting the pinion gear meshed with the second sun gear, and a speed increasing clutch for increasing speed through the planetary gear mechanism is disposed.

However, there is a problem that a axial space becomes large since the former rear differential apparatus is provided with three rows of pinion gears in the control mechanism and the latter front differential apparatus is provided with three rows of gears comprising the first and second sun gears and the planetary gear mechanism.

SUMMARY OF THE INVENTION

An active differential assembly provides speed control of an associated output shaft. A differential case is rotatably mounted within a housing to drive a pair of output shafts extending from the differential case in opposite directions for distributing driving force from the engine to wheels. A pair of planetary gear sets are one each disposed about a corresponding output shaft and includes a planetary ring gear, a sun gear fixed to the output shaft, and a planetary carrier rotatably supporting a plurality of planet gears operatively coupling the planetary ring gear with the sun gear. A brake mechanism is disposed between the planetary ring gear and the housing for selectively braking the planetary ring gear to thereby cause an associated change in speed of the axle shaft.

DESCRIPTION OF THE PROFFERED EMBODIMENTS

Figure 1:
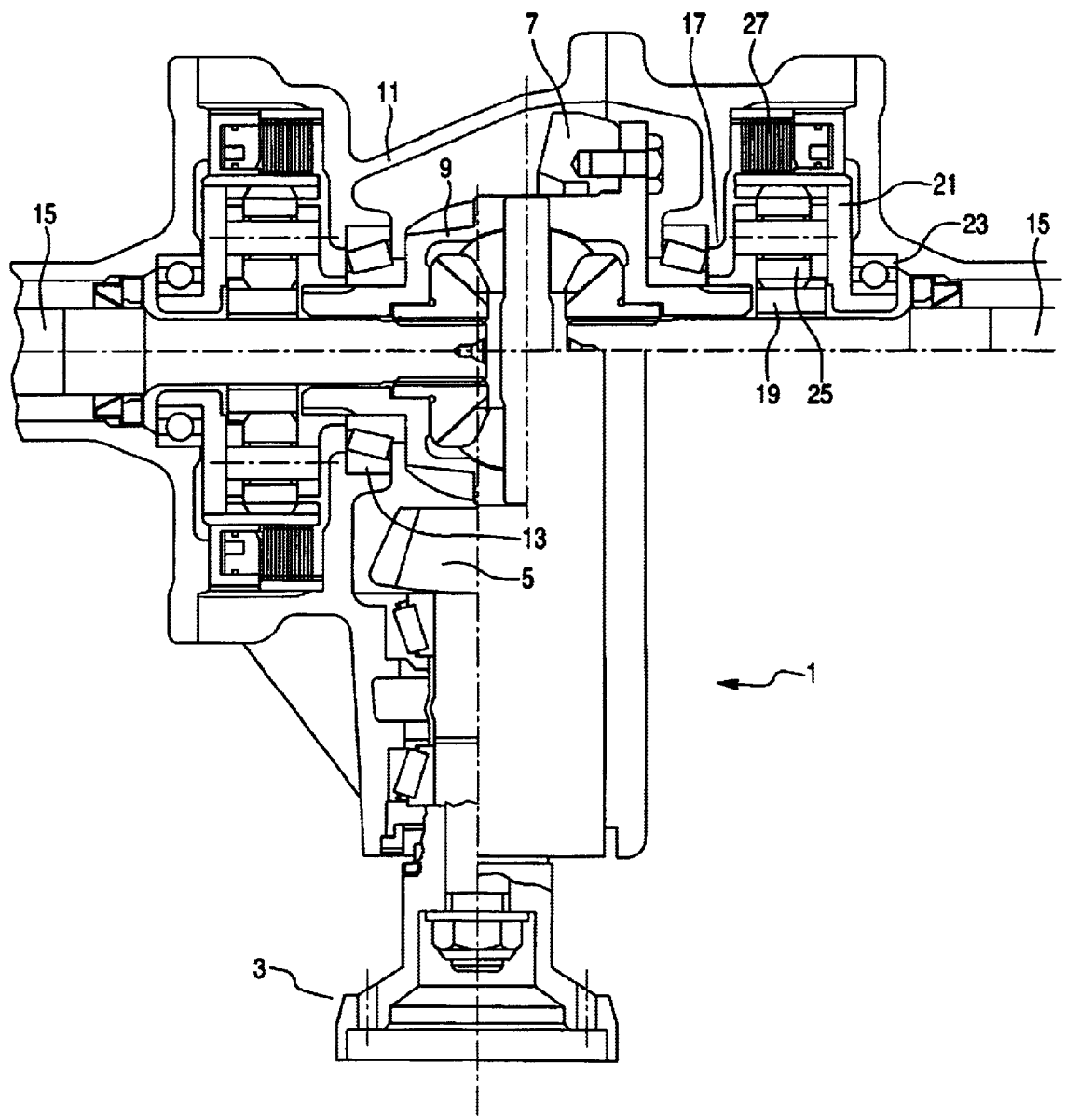
FIG. 1 is a partial sectional view of an axle assembly having an active differential assembly according to one embodiment of the present invention.

FIG. 1 depicts an axle assembly 1 having an active differential assembly according to a first embodiment of the present invention. An input drive shaft 3 is connected to a pinion gear 5 which engagably drives a ring gear 7 in a conventionally manner. The ring gear is connected to a differential case 9 rotatably mounted within the housing 11 via bearing 13. The differential case contains a gear set (side gears and spider gears, etc.) not labeled to allow differential rotational speed between a pair of opposing output shafts 15. The details of the operation of conventional differential assemblies will not be further elaborated as such is well within the knowledge of one of ordinary skill in the art.

A sun gear 19 is splined or otherwise securely fashioned to the output shaft 15 for rotation therewith. A planetary ring gear 21 is rotatably mounted within the housing 9 via bearings 23. A planetary carrier 17 is splined or otherwise securely fashioned to the differential case 9 for rotation therewith and rototably supports a plurality of planet gears 25. The planet gears 25 are engagably disposed between ring gear 21 and sun gear 19. An electronically controlled brake 27 is employed for selectively locking the planetary ring gear 21 to the housing 11. In the embodiment of FIG. 1 the brake 27 includes interleaved clutch plates on the housing and the ring gear to cause braking of the ring gear with respect to the housing.

When the brake is not activated, the differential assembly functions much like a conventional differential assembly. The planetary carrier 17 is rotated together with the differential case 9 and ring gear 7. However, the planetary ring gear 21 is allowed to freely rotate with respect to the housing 11. Thus conventional differential speed rotation between the output shafts 15 is permitted by virtue of the orbiting planet gears 25 and the ability for the planet gears 25 to freely spin and thus rotate relative to the planetary ring gear 21 and sun gear 19. When the output shafts 15 rotate at the same speed together with the differential case 9, the planet gears 25 simply orbit the sun gear 19 without spinning and the sun gear 19, planetary carrier 17 and planet ring gear 21 all rotate together about the axis of the output shaft 15. However, when differential rotation occurs between the output shafts 15, the planet gears spin allowing relative rotation between the output shaft 15 and differential case 9.

The electronic brake assembly is simply coupled to the vehicle control or brake control unit for selective activation of the brake assembly 27. A computer algorithm determines when and whether it is necessary to increase the speed of an output axle shaft 15. When necessary to increase the speed of the axle shaft 15, the brake 27 is activated/applied and the ring gear 21 is slowed or braked relative to the housing 11 which will cause the output axle shaft to speed up to the point where the planetary ring gear 21 rotation is stopped at which point the active differential assembly will provide a fixed speed increase. Allowing the brake to slip in a controlled fashion may also be employed to provide intermediate speed increase.

It is noted that while the details of the planetary gear and brake assembly have been described with reference to a single side of the axle assembly, a second planetary gear set and brake assembly are disposed about the opposite output shaft 15 as shown in FIG. 1 the operation of which is identical and will not be further elaborated.

Figure 2:
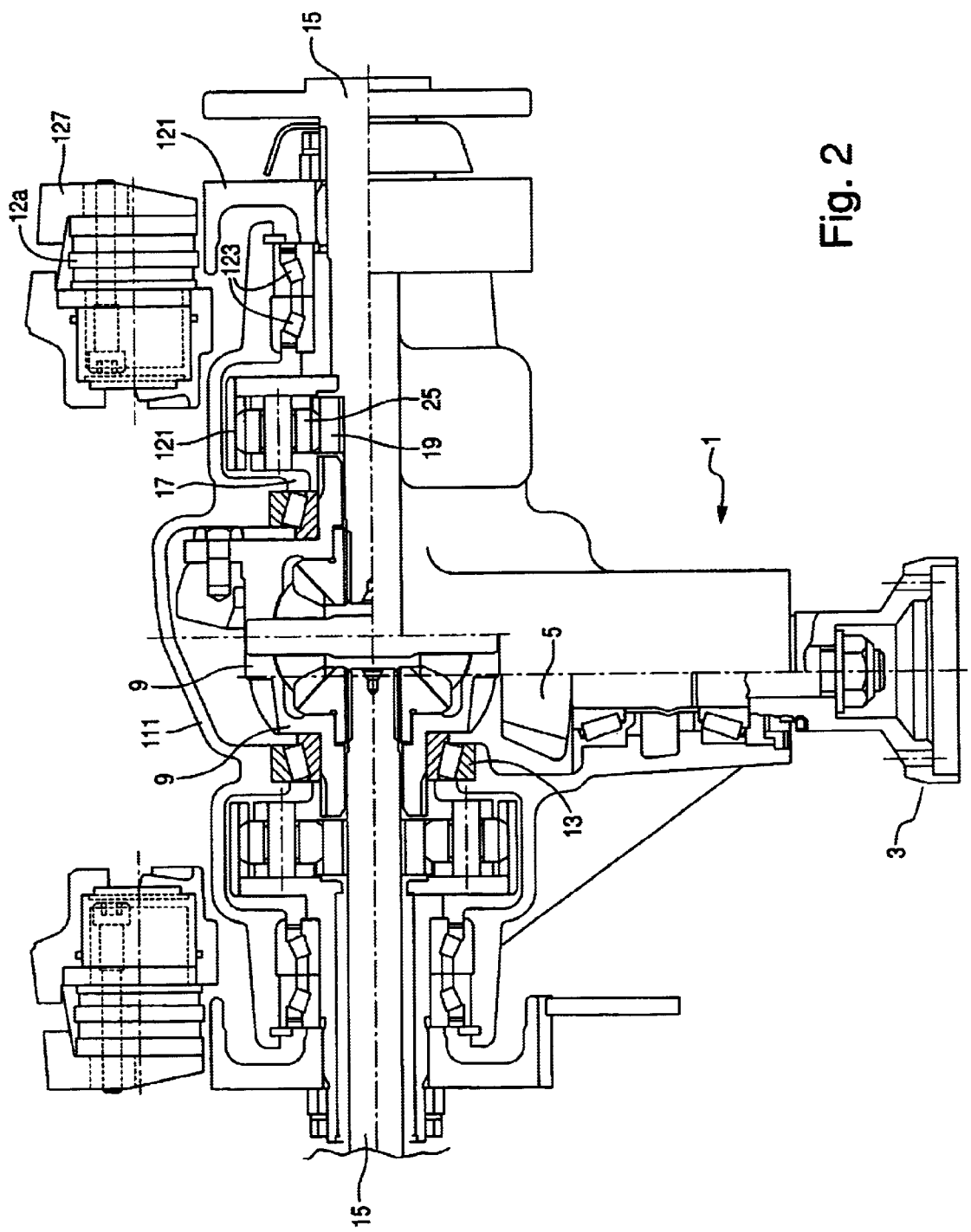
FIG. 2 is a partial sectional view of an axle assembly having an active differential assembly according to an alternate embodiment of the present invention.

FIG. 2 represents another preferred embodiment of the present invention. In this embodiment many of the components are identical to the previous embodiment and therefore, like components are given identical reference numerals, the explanation of which does not need to be repeated. In the embodiment of FIG. 1, the planetary ring gear 121, brake assembly 127 and housing 111 significantly different from the previous embodiment. The planetary ring gear 121 extends laterally outward towards the wheel end and is rotatably supported by a bearing assembly 123 and in turn is connected to a disc rotor 129 extending outside the housing 111. A disc brake caliper 127 is mounted relative to the housing 111 and may be connected to the vehicle brake control unit, or vehicle control unit for selective activation of the brake caliper 127. As in the previous embodiment of FIG. 1, activation of the brake 127 retards rotation of the planetary ring gear 121 relative to the housing 111 to increase the rotational speed of output shaft 15. Locating the brake assembly 127 outside of the housing allows utilization of a more sophisticated disc brake caliper assembly unconfined by the dimensions of the housing 111. The rotor 129 also is located further out radially relative to the output shaft 15 and additional torque may be easily applied. Eliminating the brake from within the housing also facilitate better packaging of the planetary gear set within the housing 11 thus allowing more versatile design of the planetary gearing between the differential case 9 and the output shaft 15. However, the use of such a disc type brake outside the differential housing 11 has a more significant advantage. The active differential assembly and braking arrangement of the presently described invention facilitates easy integration with current ABS braking systems. All that is necessary is a slight change to the control algorithm to allow existing braking systems to control the active differential assembly and thereby provide the ability to control Yaw, etc. without affecting the vehicles primary braking system.

Figure 3:
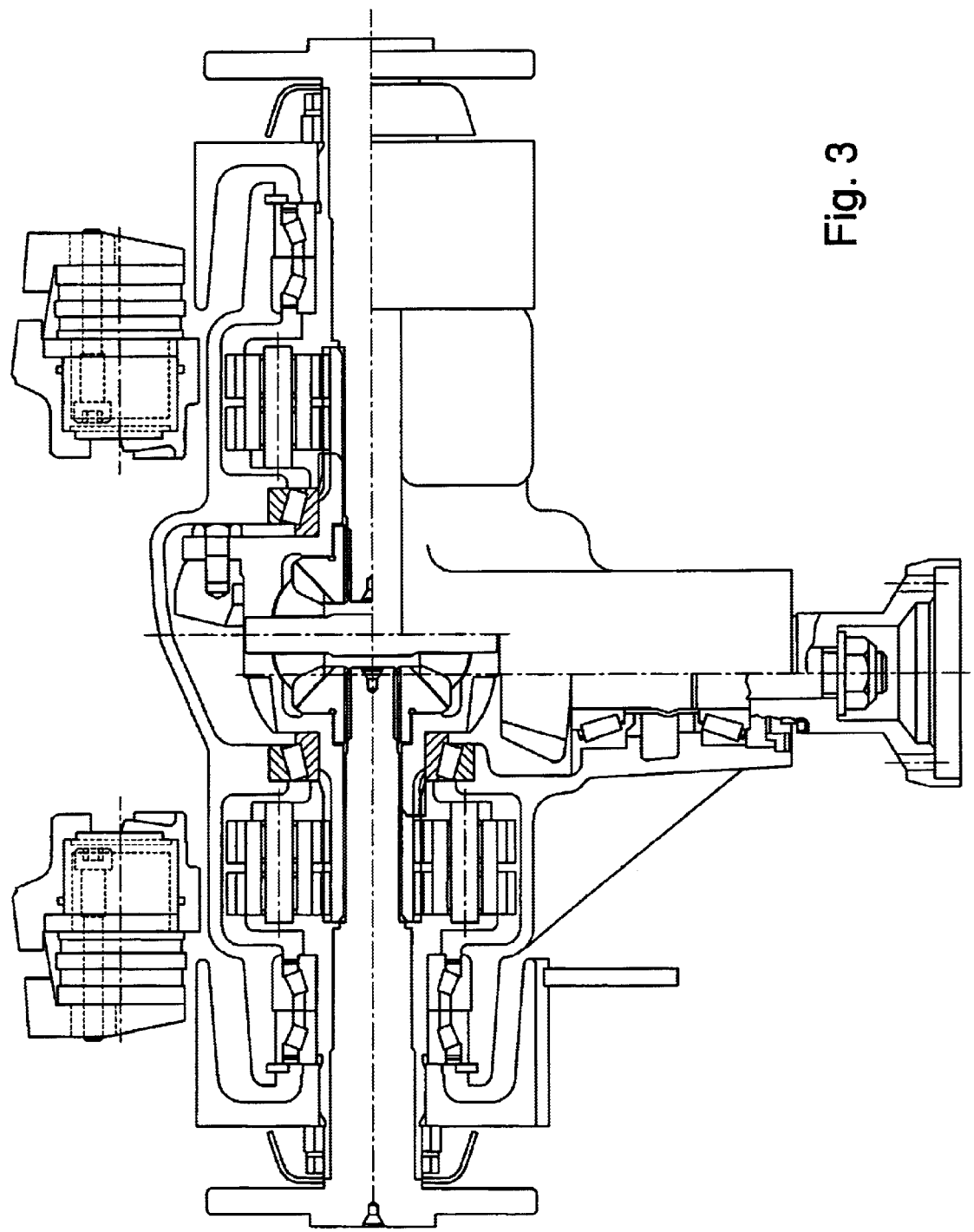
FIGS. 3–5 represent additional alternate embodiments of the present invention.
Figure 4:
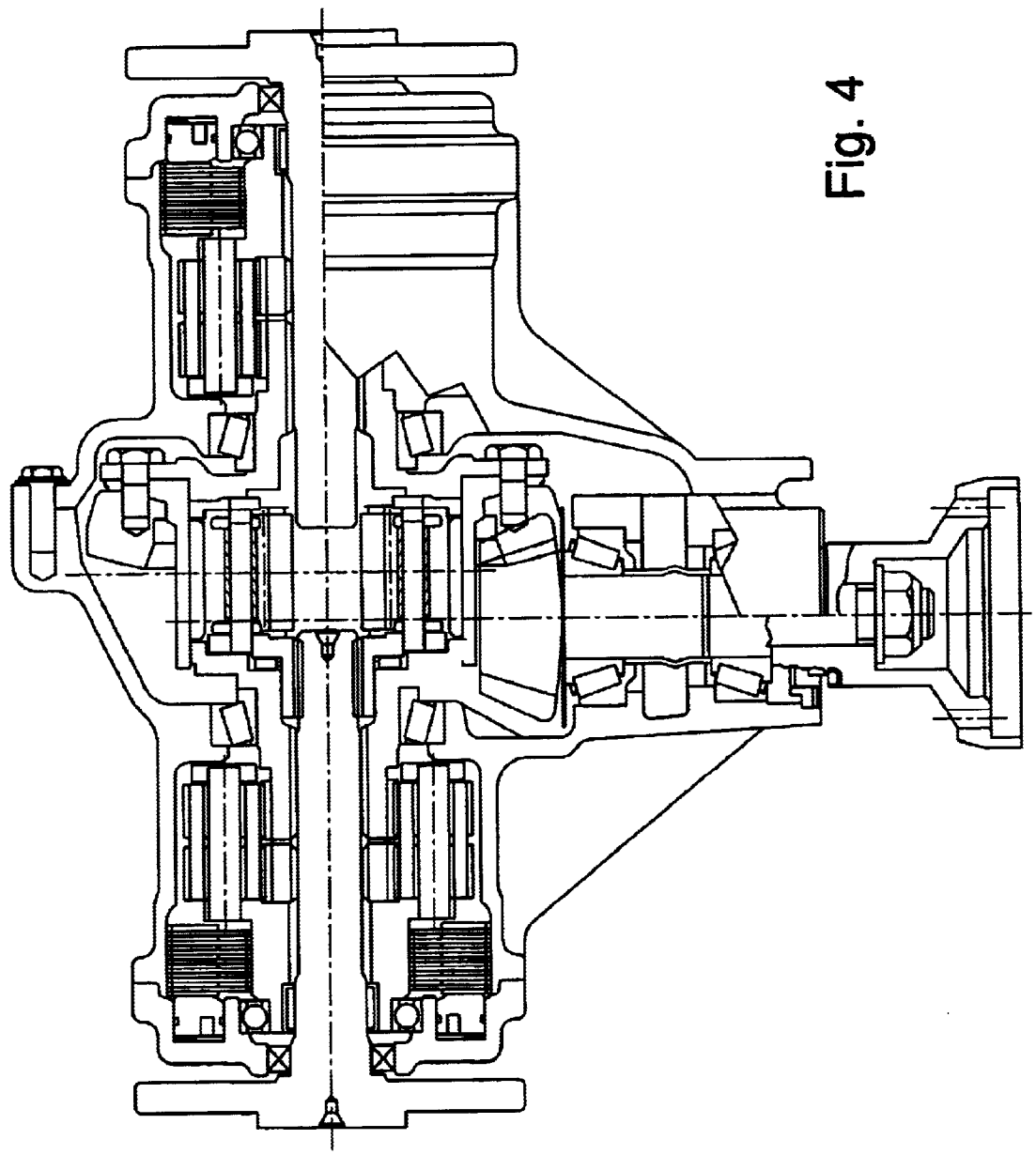
Figure 5:
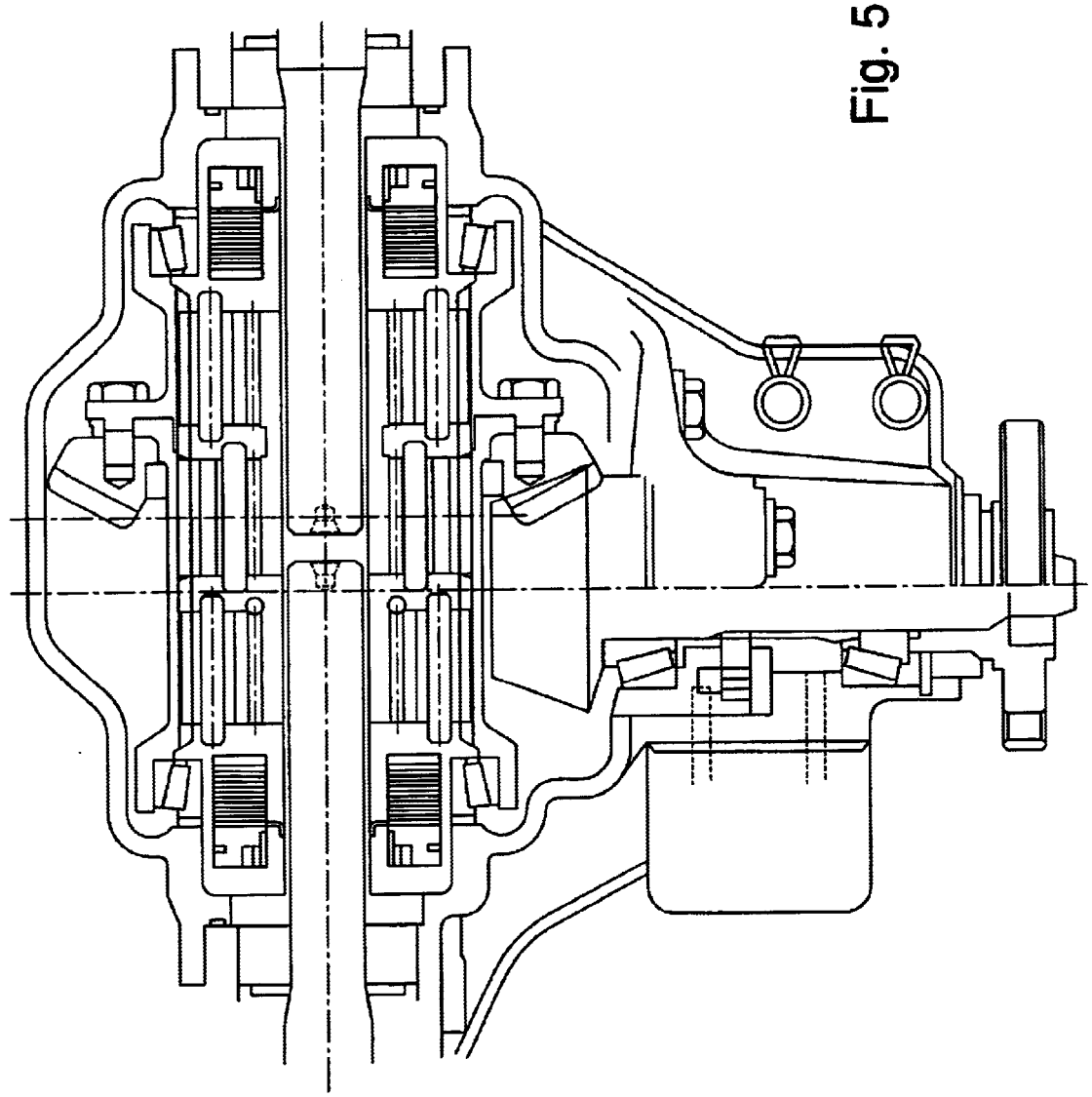

FIGS. 3–5 represent alternate embodiments of the present invention. FIG. 3 discloses the use of a dual sun planetary layout for the speed increaser/decreaser. FIG. 5 depicts the use of three planetary differentials instead of a conventional differential gear assembly and two planetary differentials. FIG. 4 depicts a dual dual sun planetary layout for the speed increaser/decreaser and a planetary differential assembly.

While the foregoing invention has been shown and described with reference to a preferred embodiment, it will be understood by those possessing skill in the art that various changes and modifications may be made without departing from the spirit and scope of the invention. For example, while the present invention has primarily been described for use to control speed increase/decrease between the output shaft and differential case 9, the device can also be employed in place of a limited slip differential. When one wheel starts to slip, the slower wheel could be driven to a faster speed by activating the brake 27 thereby reducing the speed of the excessively spinning wheel and providing more torque to the slower wheel. The planetary gear arrangement could also provide gear reduction. In such instance the sun gear could be the input, the planetary ring gear connected to ground through the braking mechanism and the planetary carrier serving as the output. In this arrangement the planetary gear assembly would reduce the speed of the faster axle shaft when the brake was applied. The device could also be employed to increase the speed of a rear axle in a four wheel drive system or to control an interaxle differential on a full time all wheel drive system.

If both brakes were applied at the same time the system would act as a parking brake. This would eliminate the need for a parking brake in the wheel end there by effectively reducing the unsprung mass of the wheel end and also the cost of the parking brake.

Other planetary arrangements could also be used to either increase or decrease the axle speed.

Also by adding clutches only one planetary could be used to control the axle shaft speed. That is, with a ring gear input and the carrier grounded we would get a speed increase of the axle shaft and with the carrier input and the sun gear grounded we would decrease the speed of the axle shaft. Since the axle shaft is connected to the axle differential when we speed up one side we slow down the other so one planetary could be used to control both axle shafts.

What is claimed is:

1. A differential apparatus comprising:
a differential case rotatably mounted within a housing;
a differential gear mechanism rotatably mounted in said differential case, said differential gear mechanism having a driving member rotatably driven by driving force from an engine, said differential gear mechanism further having a pair of output shafts extending from said differential case in opposite directions for distributing the driving force from said engine to wheels;
a pair of opposite planetary gear sets operatively connected to said differential case independent from said output shafts and disposed outside said differential case, each of said planetary gear sets is disposed about one of said output shafts and includes a planetary ring gear, a sun gear and a planetary carrier rotatably supporting a plurality of planet gears operatively coupling said planetary ring gear with said sun gear; and
a brake mechanism for selectively braking said planetary ring gear of at least one of said planetary gear sets relative to said housing.

2. The differential apparatus as defined in claim 1, wherein each of the planetary ring gears of said planetary gear sets is connected to a disc brake rotor extending outside said housing and engaging a disc brake assembly fixed relative to said housing, and said sun gear being drivingly connected to a corresponding one of said pair of output shafts whereby when said disc brake rotor is braked the planetary ring gear is slowed causing an associated increase in speed of the output shafts.

3. The differential apparatus as defined in claim 1 further comprising: an electronically controlled clutch pack operatively disposed between and connecting said ring gear and said housing to selectively retard relative rotation between said ring gear and said housing.

4. The apparatus according to claim 1, wherein said brake mechanism is disposed external said housing.

5. A differential apparatus comprising:

a differential case rotatably mounted within a housing;

a differential gear mechanism rotatably mounted in said differential case, said differential gear mechanism having a driving member rotatably driven by driving force from an engine, said differential gear mechanism further having a pair of output shafts extending from said differential case in opposite directions for distributing the driving force from said engine to wheels;

a pair of opposite planetary gear sets associated with said differential gear mechanism and disposed outside said differential case, each of said planetary gear sets is disposed about one of said output shafts and includes a planetary ring gear, a sun gear and a planetary carrier rotatably supporting a plurality of planet gears operatively coupling said planetary ring gear with said sun gear; and a brake mechanism for selectively braking said planetary ring gear of at least one of said planetary gear sets;

wherein said sun gear is drivingly connected to one of said output shafts and said planetary carrier is drivingly connected to said differential case.

6. The differential apparatus as defined in claim 5, wherein each of the planetary ring gears of said planetary gear sets is connected to a disc brake rotor extending outside said housing and engaging a disc brake assembly fixed relative to said housing, and said sun gear being drivingly connected to a corresponding one of said pair of output shafts whereby when said disc brake rotor is braked the planetary ring gear is slowed causing an associated increase in speed of the output shafts.

7. The differential apparatus as defined in claim 5 further comprising: an electronically controlled clutch pack operatively disposed between and connecting said ring gear and said housing to selectively retard relative rotation between said ring gear and said housing.

8. The apparatus according to claim 5, wherein said brake mechanism is disposed external said housing.

9. An axle assembly comprising:

an active differential assembly having a housing and a differential case rotatably supported within said housing;

a pair of coaxially aligned output axle shafts extending from said housing;

first and second planetary gear sets disposed between said housing and, respectively, each axle shaft to increase or decrease the speed of the output axle shafts;

said first and second planetary gear sets including;

a ring gear rotatably mounted within said housing through a bearing assembly disposed between said housing and said ring gear;

a planetary carrier secured to said differential case for rotation therewith within said housing;

a sun gear fixed to a corresponding one of said axle shafts;

a plurality of planet gears rotatably mounted to said planetary carrier and disposed between and engaging said sun gear and said ring gear; and an electronically controlled brake for locking said ring gear of each of said first and second planetary gear sets to said housing, said brake comprising a interleaved clutch plates on said housing and said ring gear to cause a braking of said ring gear with respect to said housing;

whereby when said brake is activated the planetary ring gear is slowed causing an associated increase in speed of said corresponding one of said axle shafts.

* * * * *